G. E. EBERLY.
NUT LOCK.
APPLICATION FILED AUG. 13, 1915.

1,168,613.

Patented Jan. 18, 1916.

Witness
A. D. Schrader

Inventor
GEO. E. EBERLY
By Fred C. Dillman
Attorney

THE COLUMBIA PLANOGRAPH CO., WASHINGTON, D. C.

UNITED STATES PATENT OFFICE.

GEORGE E. EBERLY, OF SHREVE, OHIO.

NUT-LOCK.

1,168,613.  Specification of Letters Patent.  Patented Jan. 18, 1916.

Application filed August 13, 1915. Serial No. 45,274.

*To all whom it may concern:*

Be it known that I, GEORGE E. EBERLY, a citizen of the United States, residing at Shreve, in the county of Wayne and State of Ohio, have invented certain new and useful Improvements in Nut-Locks, of which the following is a specification.

My invention relates to improvements in nut locks, the primary object being to provide a generally improved nut lock which will be exceedingly simple in construction, cheap of manufacture, and efficient in use.

A further object is the provision of an improved nut lock which will not in any way impair or interfere with the ordinary form or function of the bolt and nut, as well as one in which the nut may not only be readily applied and removed from the bolt, but will be automatically locked in any desired adjusted or applied position, and one in which the nut locking device may be readily and quickly released for the retrograde or loosening movement of the nut as desired.

With the above mentioned and other ends in view, the invention consists in the novel construction, arrangement, and combination of parts, hereinafter described, illustrated in some of its embodiments in the accompanying drawings, and particularly pointed out in the appended claims.

Figure 1:
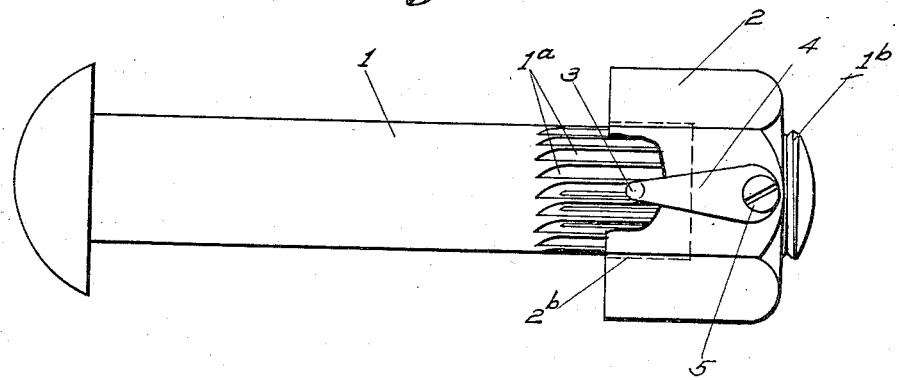
Figure 2:
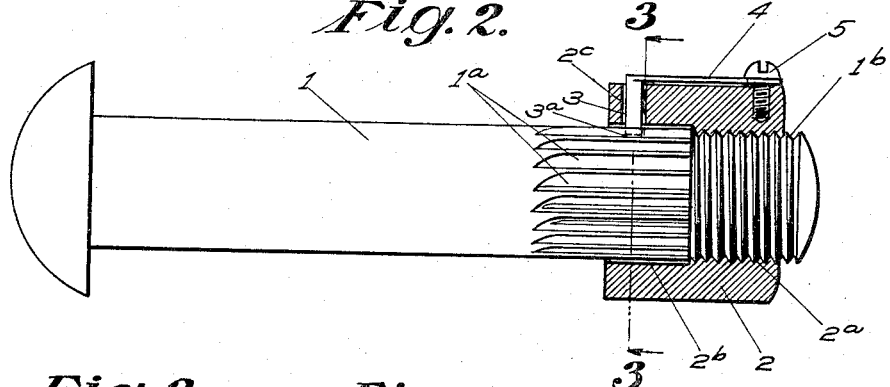
Figure 3:
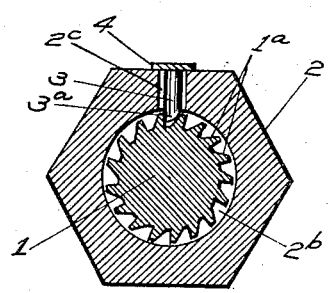
Figure 4:
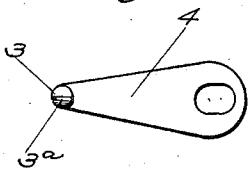
Figure 5:
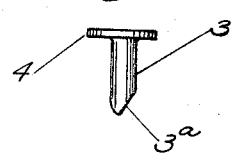
Figure 6:
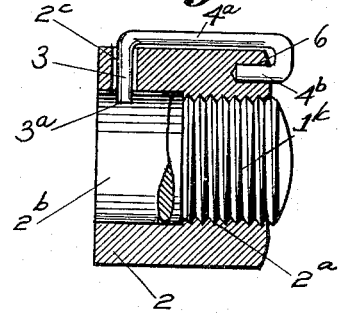

Referring to the accompanying drawings, forming a part of this specification, Figure 1, is a plan view of a bolt and nut embodying my invention, portions of the nut being broken away for the purpose of clearer illustration of the parts. Fig. 2, a similar view, the improved nut being shown in central longitudinal section. Fig. 3, a cross sectional view taken on line 3—3 of Fig. 2. Fig. 4, a detail plan view of the underside of the spring pawl, or dog, detached. Fig. 5, an end view of the same. Fig. 6, a central longitudinal sectional view of the nut showing a modified form of spring pawl or dog.

Similar numerals of reference designate like parts throughout all the figures of the drawings.

The improved nut lock comprises a suitable bolt 1, provided near one end with a toothed section made up of a series of longitudinally extending ratchet teeth $1^a$, and terminates in a threaded section or portion $1^b$. The improved nut 2, is, preferably, elongated as shown, and is provided with a threaded opening $2^a$, at one side adapted to be threaded on the threaded portion $1^b$, of the bolt, said threaded portion $2^a$, terminating in an enlarged circular shaped opening $2^b$, adapted to receive and surround the ratchet teeth $1^a$, so that the latter may pass freely therein when the nut 2, is being adjusted. The nut 2, is provided with a radial opening $2^c$, extending to the outer side of the nut and intersecting the enlarged smooth opening $2^b$, said opening $2^c$, being adapted to receive and contain a vertically movable spring resisted pin or dog 3, having a beveled head $3^a$, adapted to coöperate with and ride upon the inclined ratchet teeth $1^a$.

The teeth $1^a$, are rearwardly beveled and provided with shoulders so that the inclined ends $3^a$, of the dog or pin, will ride freely over the ratchet teeth when the nut is being turned up and will engage with the shoulders of the teeth $1^a$, as against retrograde movement of the nut or when an attempt is made to turn the nut back without first raising the locking dog.

As a means of properly supporting and operating the pin or dog 3, a flat spring 4, is mounted on the nut 2, and has its ends secured by means of a securing screw 5, the free end of the spring 4, carrying the pin or dog 3, and when it is desired to unloosen the nut, the pin or dog 3, may be readily elevated through the medium of the free end of the spring 4, or by inserting a tapered tool between the free end of the said spring 4, and the subjacent portion of the nut 2. The tension of the pin or pawl 3, may be readily adjusted by adjusting the securing screw 5, threaded into the threaded opening in the nut 2.

In Fig. 6 of the drawings, I have shown a modified form of locking device or spring pawl, and method of mounting same, the locking device being formed of a single length of spring wire bent at one end to form the pin or dog 3, and at the other formed into a securing loop head $4^b$, mounted in an opening 6, in the nut, the intermediate portion of the wire forming a spring member $4^a$.

From the foregoing description, taken in connection with the accompanying drawings, the operation and advantages of my invention will be readily understood.

Having thus described some of the em- bodiments of my invention, without having attempted to set forth all the forms in which it may be made, or all the modes of its use, what I claim and desire to secure by Letters Patent, is,—

1. A nut lock, comprising a bolt provided with a toothed section and a reduced threaded section, and a nut having a threaded portion terminating in an enlarged opening receiving said toothed section, said nut having a radial opening in one side intersecting said enlarged opening, and a spring pressed pin mounted in said radial opening in coöperative relation to said toothed section.

2. A nut lock, comprising a bolt having a longitudinally serrated section and a reduced threaded end section, a nut having threaded and unthreaded openings receiving and corresponding in diameter to said threaded and serrated sections, respectively, said nut also having a radial opening leading from said unthreaded opening, and a detachably mounted exterior spring member carrying a depending pin freely movable in said radial opening and having a beveled head resiliently bearing on said serrated section.

3. In a nut lock, a bolt having a ratchet section terminating in a reduced threaded section at one end, a nut provided with an opening having threaded and unthreaded sections receiving and corresponding in diameter to said threaded and serrated sections, respectively, said unthreaded section being intersected by a radial pawl receiving opening, and a spring member detachably secured at one end to the outer side of said nut and provided at its free end with a depending pawl movable in said opening in coöperative relation to said ratchet section.

4. In a nut lock, the combination with a bolt provided with longitudinal rearwardly beveled ratchet serrations terminating in a reduced threaded portion at one end of the bolt; of an elongated nut threaded on the latter and provided with an enlarged opening on its inner side receiving and containing said ratchet serrations, said nut having a radial opening intersecting said enlarged opening and leading to said serrations, and an exterior spring member removably secured to said nut near the outer edge thereof and terminating in a beveled pin movable in said radial opening in coöperative relation to said serrations.

5. In a nut lock, a bolt having a longitudinally serrated section terminating in a reduced threaded section at the outer end thereof, an elongated nut having threaded and unthreaded openings mounted on and corresponding in diameter to said threaded and serrated sections, respectively, said nut having a radial pin receiving opening intersecting said unthreaded opening, and a detachably and adjustably mounted spring member on the outer side of said nut carrying a pin moving in said opening in coöperative relation to said serrated section.

In testimony whereof I have affixed my signature in the presence of two witnesses.

GEORGE E. EBERLY.

Witnesses:
JOHN S. FRABLE,
CHAS. BENINGTON.

Copies of this patent may be obtained for five cents each, by addressing the "Commissioner of Patents, Washington, D. C."